(12) United States Patent
Chong et al.

(10) Patent No.: US 7,258,449 B2
(45) Date of Patent: Aug. 21, 2007

(54) PORTABLE DEVICE WITH ILLUMINATION AND METHOD THEREFOR

(75) Inventors: Kin Fui Chong, Singapore (SG); Kittichai Reawsanguanwong, Guiline Garden (SG); Boon Keat Eddy Toh, Singapore (SG)

(73) Assignee: Creative Technology Ltd, Singapore (SG)

( * ) Notice: Subject to any disclaimer, the term of this patent is extended or adjusted under 35 U.S.C. 154(b) by 263 days.

(21) Appl. No.: 10/961,119

(22) Filed: Oct. 8, 2004

(65) Prior Publication Data
US 2006/0077067 A1 Apr. 13, 2006

(51) Int. Cl.
*G03B 21/20* (2006.01)
*G03B 21/14* (2006.01)
*G03B 21/22* (2006.01)
(52) U.S. Cl. ........................ 353/85; 353/119
(58) Field of Classification Search ........... 353/43, 353/85, 94, 119, 121, 122; 315/194, 294
See application file for complete search history.

(56) References Cited

U.S. PATENT DOCUMENTS

| | | | | |
|---|---|---|---|---|
| 5,909,087 | A * | 6/1999 | Bryde et al. | 315/149 |
| 6,300,727 | B1 * | 10/2001 | Bryde et al. | 315/294 |
| 6,491,395 | B2 * | 12/2002 | Shirakura et al. | 353/7 |
| 7,083,289 | B2 * | 8/2006 | Oross et al. | 353/119 |

* cited by examiner

*Primary Examiner*—Melissa Jan Koval
(74) *Attorney, Agent, or Firm*—Russell N. Swerdon; P. Francois de Villiers

(57) ABSTRACT

A portable device comprising a body, at least one wall of the body being of a translucent material and having an outer surface, an inner surface and an outer peripheral edge surface. The outer surface is coated with a first non-translucent material, there being a plurality of outer openings in the first non-translucent material to form a plurality of control indications. The inner surface is coated with a second non-translucent material, there being at least one inner opening in the second non-translucent material for at least one light source. The first non-translucent coating and the second non-translucent coating cause internal reflection within the at least one wall except for the outer openings and the outer peripheral edge through which light from the at least one light source is able to pass.

20 Claims, 6 Drawing Sheets

PORTABLE DEVICE WITH ILLUMINATION AND METHOD THEREFOR

FIELD OF INVENTION

This invention relates to a portable device with illumination, and a method for varying illumination of a portable device.

BACKGROUND TO THE INVENTION

Portable devices such as, for example, media players, MP3 players, mobile/cellular telephones, PDAs, and the like, often have manually operable controls as well as display screens such as LCD screens. Often the controls are not illuminated. Also, even if illuminated, the illumination has only two states—on and off.

SUMMARY OF THE INVENTION

In accordance with a first preferred aspect there is provided a portable device comprising a body, at least one wall of the body being of a translucent material and having an outer surface, an inner surface and an outer peripheral edge surface. The outer surface is coated with a first non-translucent material, there being a plurality of outer openings in the first non-translucent material to form a plurality of control indications. The inner surface is coated with a second non-translucent material, there being at least one inner opening in the second non-translucent material for at least one light source. The first non-translucent coating and the second non-translucent coating cause internal reflection within the at least one wall except for the outer openings and the outer peripheral edge surface through which light from the at least one light source is able to pass.

There may also be a power controller for controlling power to the at least one light source, the control being at least one of: increasing power from off to full power when the portable device is activated; decreasing power from full power to off when the portable device is deactivated; and cyclically increasing power from off to full power to off in a repeated cycle when the portable device is connected to an external source of power.

According to a second preferred aspect there is provided a portable device comprising a source of power, a power controller, a microprocessor, and a memory. There is also at least one light source for illuminating at least one of: a plurality of control indications and an outer peripheral groove. The power controller controls power to the at least one light source, the control being at least one of: increasing power from off to full power when the portable device is activated; decreasing power from full power to off when the portable device is deactivated; and cyclically increasing power from off to full power to off in a repeated cycle when the portable device is connected to an external source of power.

For the second aspect the portable device may further comprise a body, at least one wall of the body being of a translucent material and having an outer surface, an inner surface and the outer peripheral groove. The outer surface may be coated with a first non-translucent material, there being a plurality of outer openings in the first non-translucent material to form a plurality of control indications. The inner surface may be coated with a second non-translucent material, there being at least one inner opening in the second non-translucent material for at least one light source. The first non-translucent coating and the second non-translucent coating may cause internal reflection within the at least one wall except for the control indications and the outer peripheral groove through which light from the at least one light source is able to pass.

For both aspects the increase and decrease in power may both be steady and over a predetermined time. The predetermined time may be 0.5 to 5 seconds, 1 to 3 seconds, or 2.5 seconds. The portable device may further comprise an illuminated display screen, the power controller also controlling power for the illumination of the display screen in the same manner as the at least one light source. The at least one wall may be a top of the body, the display screen being located beneath an opening in first non-translucent coating. The first non-translucent coating and the second non-translucent coating may be different. The plurality control indications may be for a plurality control zones, each control indication being an indication of a function of the control zone. The plurality of light sources may not be aligned with the plurality of control indications. The outer peripheral edges may have a vertical portion and a horizontal portion, at least one of the vertical portion and the horizontal portion not being coated with the first non-translucent coating.

According to a third preferred aspect there is provided a method for controlling illumination of a portable device, the method comprising using a power controller of the portable device to control power supplied to at least one light source for providing the illumination, the control being at least one selected from: increasing power from off to full power when the portable device is activated; decreasing power from full power to off when the portable device is deactivated; and cyclically increasing power from off to full power to off in a repeated cycle when the portable device is connected to an external source of power. The increase and decrease in power may both be steady and over a predetermined time. The predetermined time may be 0.5 to 5 seconds, 1 to 3 seconds, or 2.5 seconds. The power controller may also control power for the illumination of a display screen.

For all aspects, the cycle may be to simulate a naturally-occurring cyclic pattern in at least one of: amplitude, and period. The cyclic pattern may be human and may be: heartbeat, and breathing.

BRIEF DESCRIPTION OF THE DRAWINGS

In order that the invention may be fully understood and readily put into practical effect there shall now be described by way of non-limitative example only preferred embodiments of the present invention, the description being with reference to the accompanying illustrative drawings in which.

DETAILED DESCRIPTION OF THE PREFERRED EMBODIMENT

Figure 1:
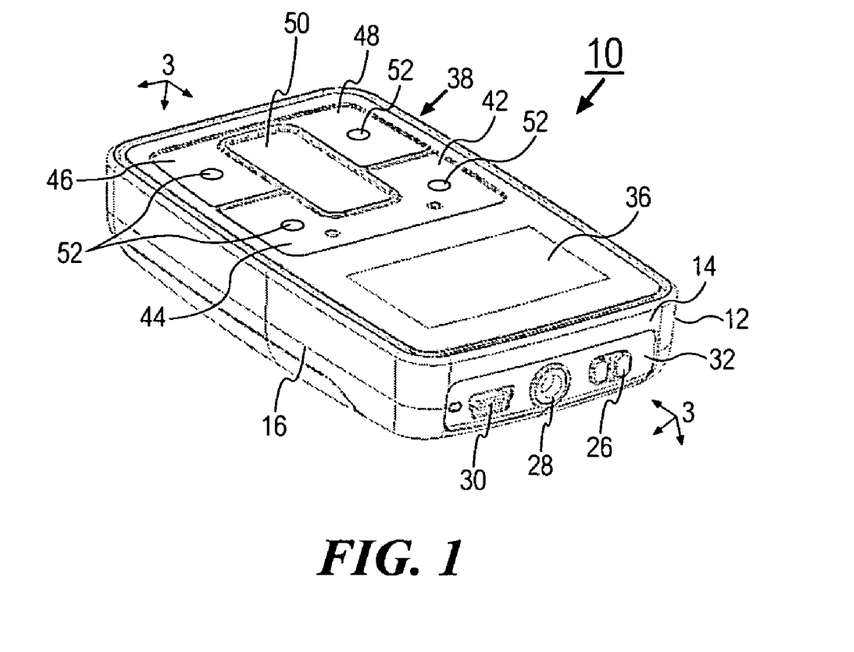
FIG. 1 is a top perspective view of a preferred embodiment.
Figure 2:
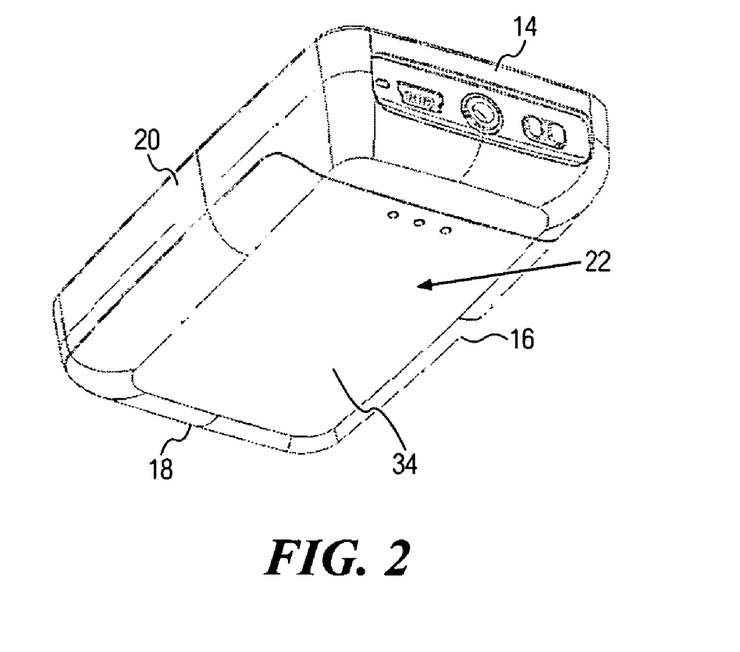
FIG. 2 is an underneath perspective view of the preferred embodiment.

To first refer to FIGS. 1 and 2 there is shown a portable device 10 that may be one or more of a media player, MP3 player, mobile/cellular telephone, PDA, or the like. As illustrated, it is an MP3 player.

The device 10 has a body 12 comprising four mutually perpendicular side walls 14, 16, 18 and 20; as well as a base 22 and a top 24. At least one of the side walls 14, 16, 18 and 20, the base 22 and the top 24 is made of a translucent material such as, for example, a translucent polycarbonate; whereas the others are preferably non-translucent. In the preferred embodiment shown, the top 24 is of a translucent material. The side walls 14, 16, 18 and 20, and the base 22, are of a non-translucent material.

Figure 3:
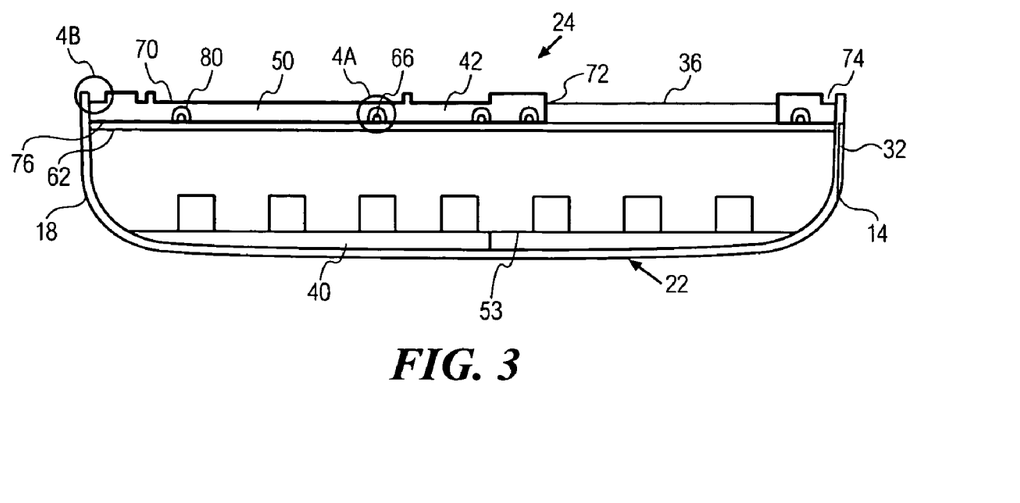
FIG. 3 is a vertical cross section along the lines and in the direction of arrows 3-3 on FIG. 1.

Mounted in a recess 32 in side wall 14 are an on-off-lock button 26, a connector 28 for headphones/speakers or the like, and an in/out connector 30 such as, for example, a USB or IEEE 1394 port. Recharging may be via the port 30. Base 22 may include a battery compartment cover 34 able to be removed for the insertion and removal of one or more rechargeable batteries 40 (FIG. 3).

Mounted beneath top 24 is a display screen 36 such as, for example, an LCD display screen. Top 24 also includes a plurality of control zones generally indicated as 38 and which comprise first control zone 42, second control zone 44, third control zone 47, fourth control zone 48 and fifth control zone 50. The number, nature and function of control zones 42, 44, 46, 48 and 50 will depend on the nature of device 10. As illustrated for an MP3 player, each of the zones 42, 44, 46, 48 and 50 may be for one of: play, skip forward, pause, skip back, stop, scroll, volume up, volume down, menu, enter/select, and so forth.

In each of the first, second, third, and fourth zones 42, 44, 46 and 48 there is a control indication 52 of the functionality of the particular zone. A control indication 52 may be provided in the fifth zone 50, if required or desired. Control indications 52 are preferably shaped appropriately—a right arrow for play, a square for stop, two vertical lines for pause, double arrows with a vertical line for skip, and so forth.

Each zone 42, 44, 46, 48 and 50 may be activated by the presence of a human finger and may therefore include sensors such as, for example, SYNAPTICS® SCROLL-STRIP® sensors available from Synaptics Incorporated of San Jose, Calif., USA.

The fifth zone 50 may be a touch scrolling zone in accordance with our earlier Singapore patent applications filed 19 Jul. 2004 and 10 Sep. 2004, both for an invention titled "Method and Apparatus for Touch Scrolling", the contents of which are hereby incorporated by reference.

Figure 4A:
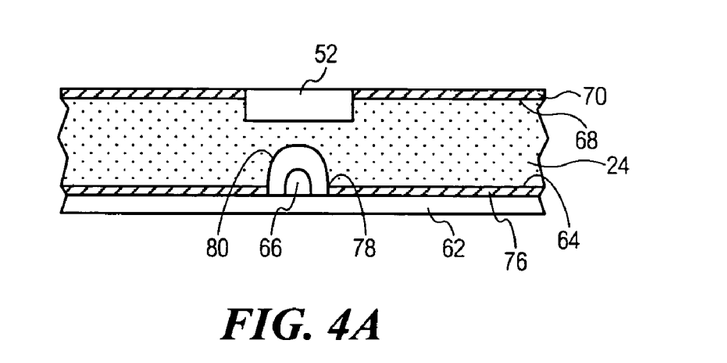
FIG. 4 is two enlarged views of parts of FIG. 3.
Figure 4B:
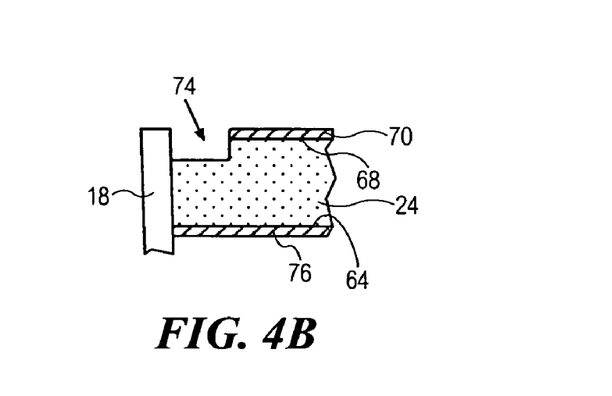
Figure 5:
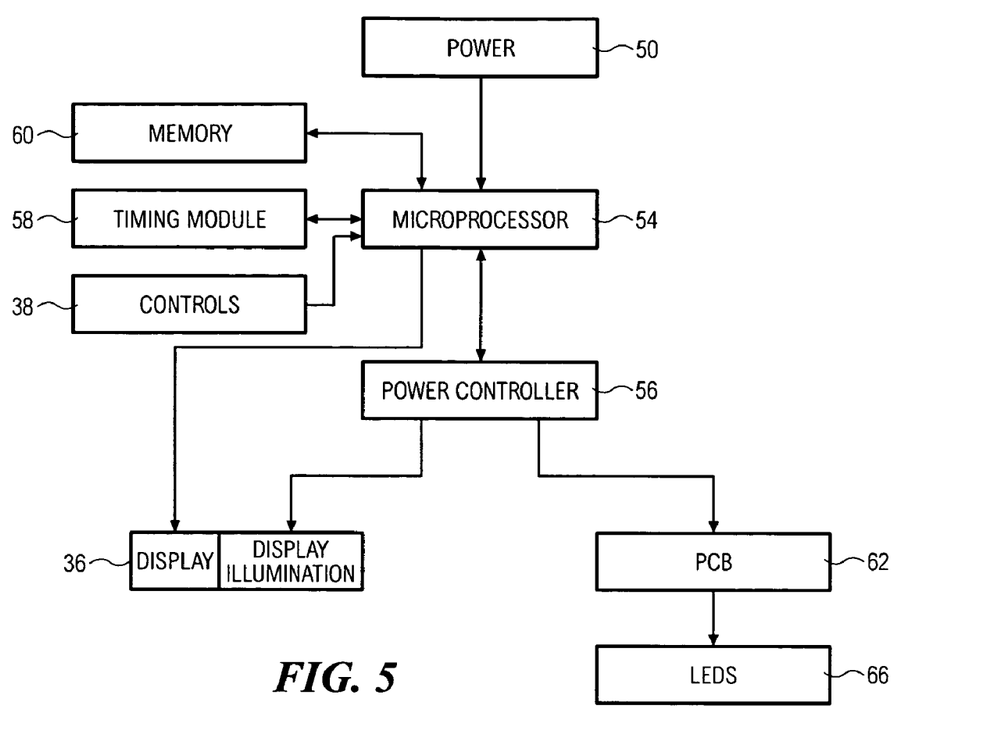
FIG. 5 is a block diagram of the embodiment of FIGS. 1 to 4.

FIGS. 3 to 5 show that within body 12 is mounted the battery 40, as well as one or more printed circuit boards 53 on which are located a number of components for device 10. The components may include a microprocessor 54, power controller 56, a timing or clock module 58 and non-volatile memory 60 such as, for example, flash memory or a disk drive.

Also mounted within body 12 but below inner surface 64 of top 24 is an upper printed circuit board 62. To upper printed circuit board 62 are mounted the sensors for the control zone 38, as well as at least one, preferably four, light sources 66. The light sources 66 are preferably LEDs of a first colour such as, for example, green, yellow, red, blue, or the like. The first colour is preferably different to the colour of the display screen 36. However, they may be the same.

The top 24 has an outer surface 68 that is coated with a first non-translucent coating 70. The coating is over all of the outer surface 68 but is not over control indications 52 nor at an opening 23 above screen 36. Control indications 52 are appropriately shaped indication openings through coating 70. Outer peripheral side edges 74 of top 24 are not coated with the first non-translucent coating 70.

Inner surface 64 of top 24 is coated with a second non-translucent coating 76 over its entire surface, except for openings 78 and opening 23. Openings 78 are aligned with light sources 66. Preferably, there are recesses 80 in inner surface 66 at openings 78 and into which the light sources at least in part locate, the recesses 80 not being coated with the second non-translucent coating 76. Therefore, light from light sources 66 can enter the top 24 through openings 78 and/or recesses 80. Little light will escape through openings 78 and/or recesses 80 due to their very limited surface area, the presence of the light sources 66 and their support structure, and upper printed circuit board 62.

The outer peripheral edges 74 comprise a vertical portion 75 and a generally horizontal portion 77 which, with walls 14, 16, 18, 20 form a generally U-shaped groove around the outer perimeter of top 24. The generally horizontal portion 77 may be inclined to the horizontal if required or desired. It is preferred that both vertical portion 75 and horizontal portion 77 are not coated with first non-translucent coating 70, but one may be coated. At least one of the vertical portion 75 and the horizontal portion 77 is not coated. Outer peripheral edges 74 form a peripheral region of reduced thickness of top 24.

Non-translucent coatings 70, 76 may be different, if required or desired. They may be painted or printed onto surfaces 64, 68. They may be reflective to assist internal reflection within top 24.

Due to top 24 being made of a translucent material, and coatings 70, 76 being non-translucent, all light emanating from light sources 66 will be reflected by coatings 70, 76 and will thus only be able to emanate from top 24 where there is no non-translucent coating 70, 76. As such light can only pass out of top 24 along the outer peripheral side edges 74 and at the control indications 52. Therefore, whenever light sources 66 are on, the outer, peripheral side edges 74 and the control indications 52 will allow the passage of light and thus be illuminated. By display screen 36 being located immediately beneath opening 23, and due to the display screen operating at the same time as the light sources 66, light from the light sources 66 will not interfere with display screen 36.

Due to the translucent nature of top 24, the limited surface area of outer peripheral edges 74 and control indications 52, and the non-translucent coatings 70,76, relatively low power light sources 66 and/or a relatively small number of light sources 66 may be used yet still provide effective illumination of the outer peripheral edges 74 and control indications 52.

Figure 6:
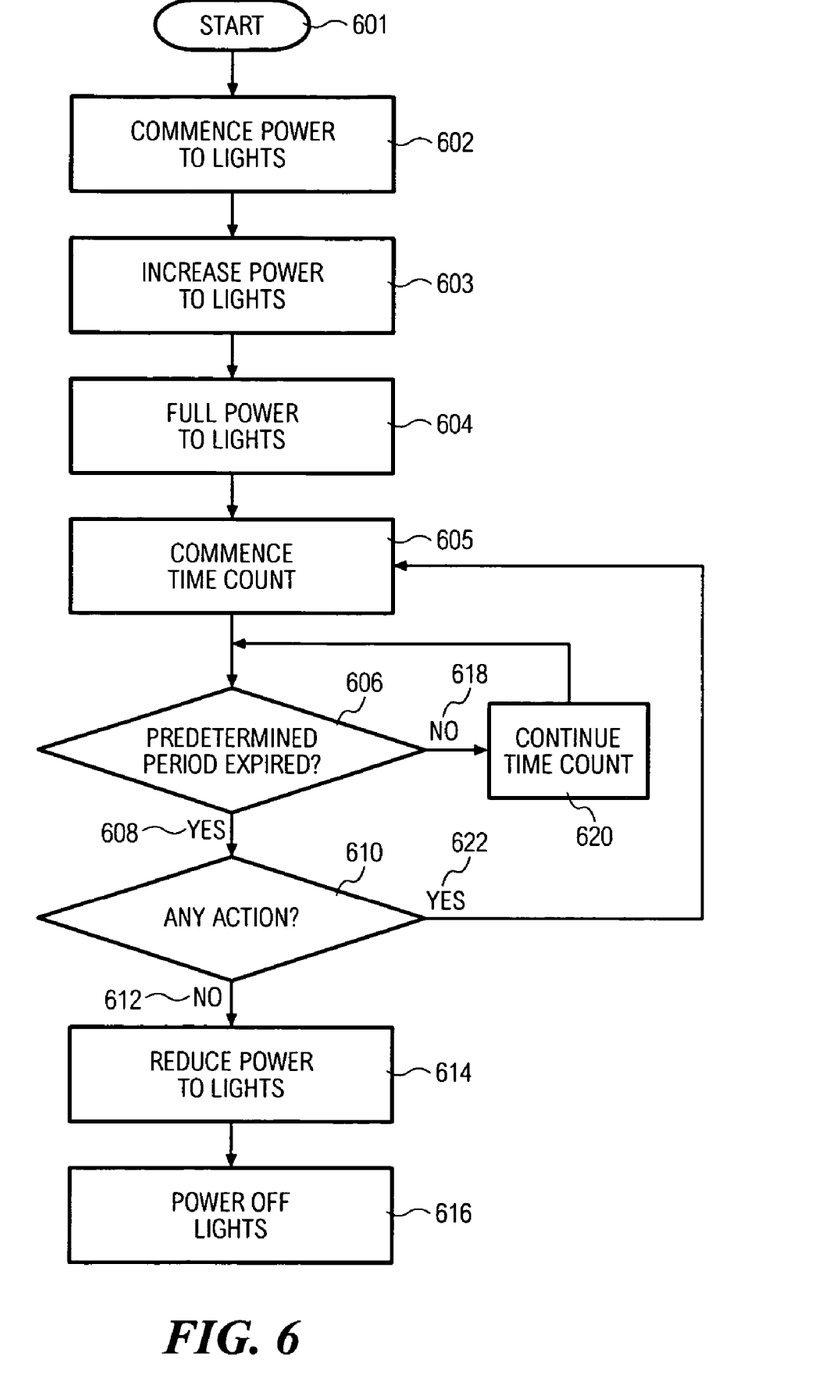
FIG. 6 is a flow chart for the operation of the embodiment of FIG. 1 to 5, at start-up.

Referring to FIG. 5, the microprocessor 54 is operatively connected to the power source—battery 50—as well as the power controller 56. Power controller 56 controls the power for the illumination of display screen 36, as well as the power for light sources 66. FIG. 6 illustrates one way in which the control may be utilized.

When device 10 is started (601) the microprocessor 54 instructs the power controller 56 to commence to power the light sources 66 (602). The power controller 56 steadily increases the power to the light sources 66 (603) until full power is being supplied to light sources 66 (604). The time taken from (602) to (604) is controlled by clock module 58. The time may be pre-set, user set, or user selected from menu options on display screen 36. Preferably, the time is in the range of 0.5 to 5 seconds, more preferably 1 to 3 seconds, and most preferably is 2.5 seconds.

The light sources 66 will consume power therefore a clock count is started (605) as soon as full power is achieved and, after a predetermined period has expired (606, 608) without any zone of control zone 38 being utilized or operated by a user (610, 612), the power to the light sources 66 is reduced (614) until all power to the light sources 66 is off such that the light sources 66 are off (616). The time taken from (614) to (615) is preferably the same as the time for the increasing power to the lights from (602) to (604).

If no (618) at (606), the time count continues (620) until the predetermined time expires. If there has been a user action (622) at (610) the clock count is reset and recommences at (605).

Figure 7:
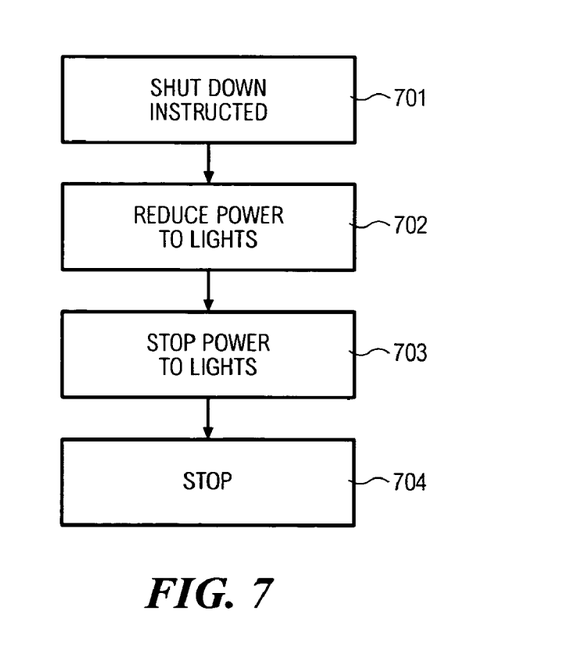
FIG. 7 is a flow chart for the operation of the embodiment of FIGS. 1 to 5 at shut-down.

In FIG. 7, when a user instructs device 10 to switch off (701), or microprocessor 54 detects no activity for a required, preset period, the power to light sources 66 is reduced (702) until all power is stopped (203) and light sources 66 are off. The device 10 can then switch off (704) or enter standby or sleep mode. Again the time from (701) to (703) is preferably the same as from (602) to (604).

Figure 8:
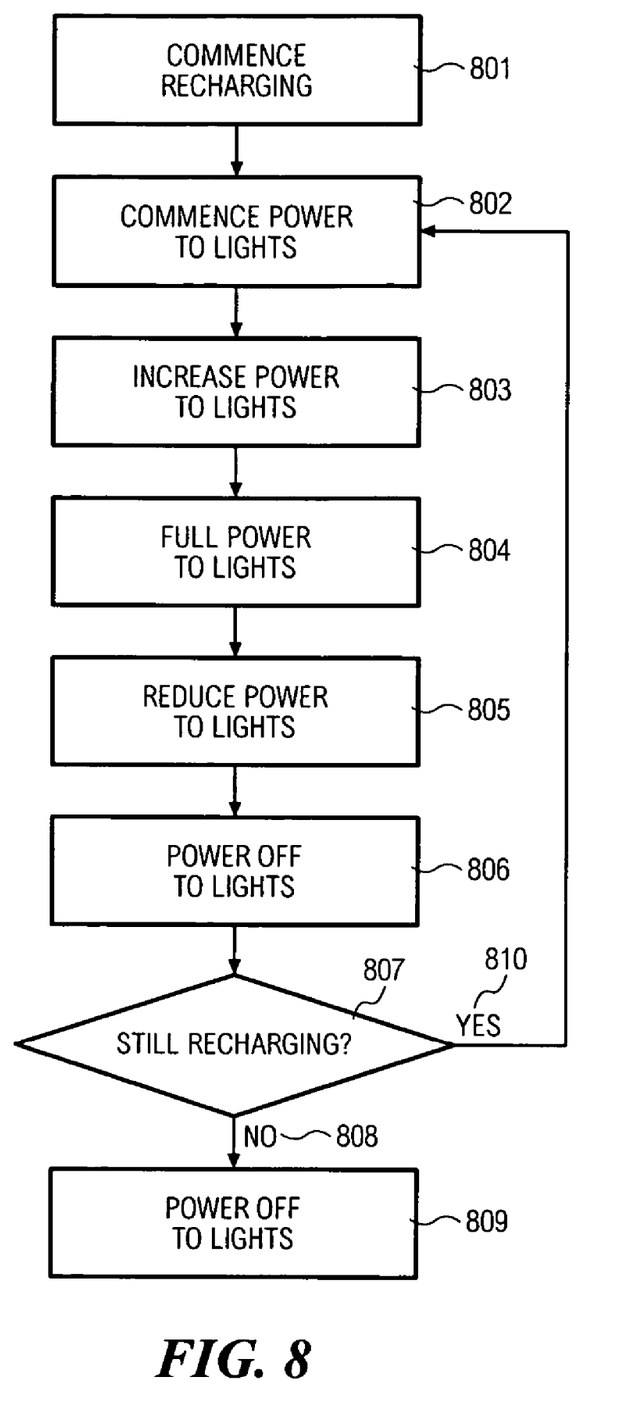
FIG. 8 is a flow chart for the operation of the embodiment of FIGS. 1 to 5 during a recharging operation.

FIG. 8 shows the flow when microprocessor 54 detects that a recharger is operatively connected and thus battery 40 is being recharged and/or device 10 is being operated using an external power source such as, for example, mains power or power from a generator.

When recharging/external power commences (801) power starts being supplied to light sources 66 (802). The power is increased (803) until there is full power to light sources 66 and they are fully illuminated (804). The time taken from (802) to (804) is preferably the same as from (602) to (604). Upon full power being achieved at (804), the power is reduced steadily (805) until all power to the lights is off (806) and the light sources 66 are off. The time from (804) to (806) is preferably the same as from (602) to (604). There may be a pause at (804) so that full power is supplied to the lights 66 for a relatively short period.

A query is then raised (807) to determine it recharging/external power is continuing. If it is (810), the process reverts to (802). If not (808), power to the light sources 66 remains off (809) pending other action such as, for example, the process of FIG. 6. The cycle of (802) to (806, 802) is shown graphically in FIG. 9. As can be seen, the cycle is rather saw-tooth in appearance. Other wave shapes may be used.

Figure 10:
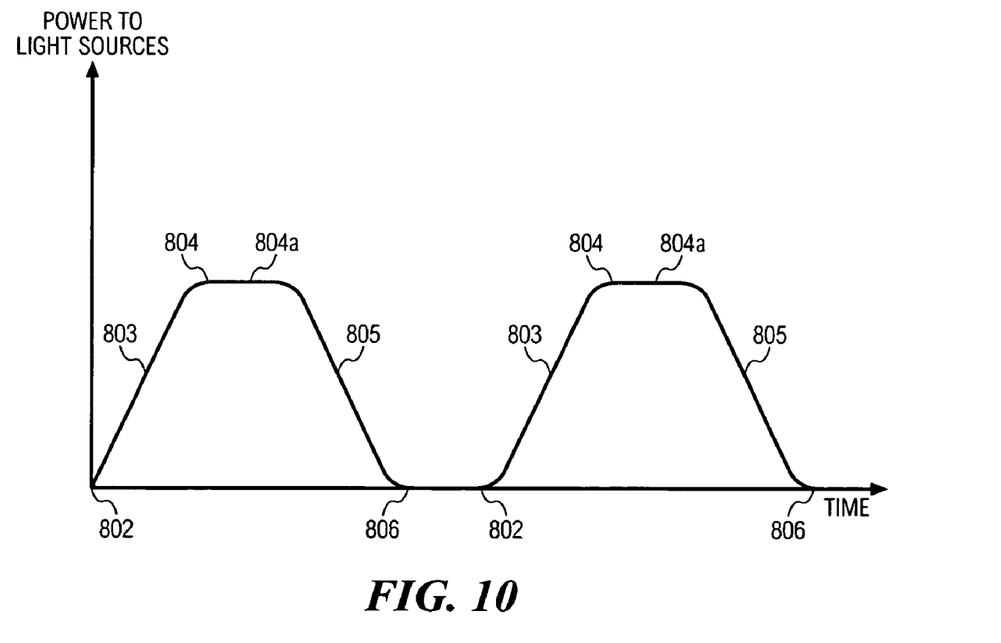
FIG. 10 is a graphical representation of a variation of the power cycle of FIG. 9.

In this way the light sources 66 are illuminated in a regular, cyclic pattern of increasing and diminishing light output simulating naturally-occurring regular cyclic patterns such as, for example, breathing, heartbeat, and so forth. These may be for regularly-occurring human cyclic patterns and may be not only for the period but also the amplitude. As such there may be included portions of relatively constant amplitude during the cycle to match the "pauses" in a natural breathing cycle before exhaling, and before inhaling. This is shown in FIG. 10 with the portions of relatively constant amplitude being between (806) and (802)—i.e. before inhaling—and between (804) and (804a)—i.e. before exhaling.

Figure 9:
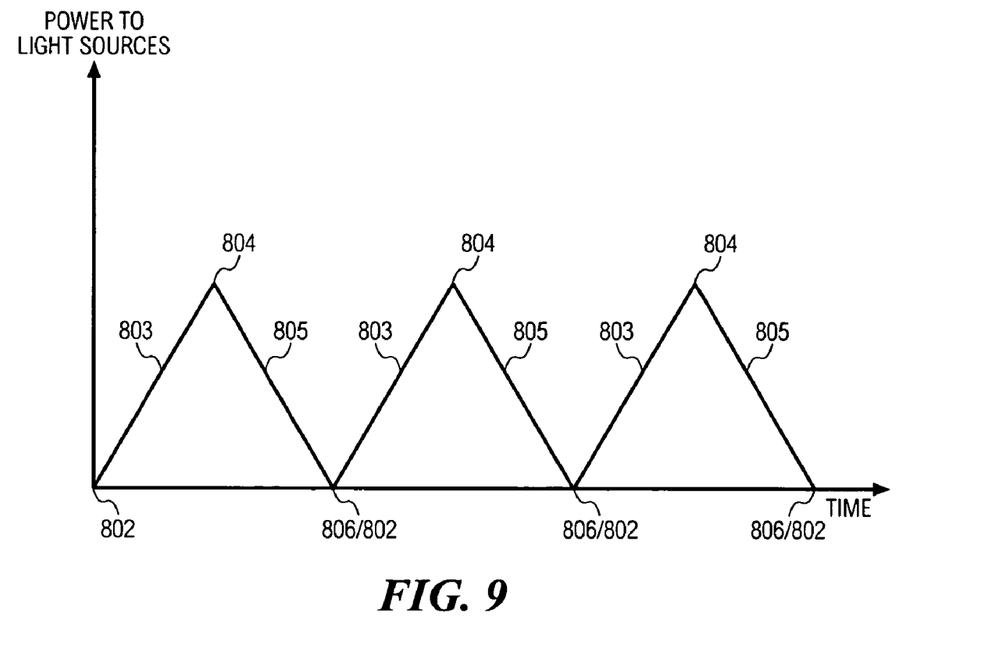
FIG. 9 is a graphical representation of the power cycle of FIG. 8.

The illumination of the display screen 36 may be included in the cycle of FIGS. 8 and 9 such that it increases and diminishes with and to the same extent as the light sources 66.

In this way sensors may be located beneath zones 38 and the light sources 66 do not need to be aligned with the control indications 52 and may be not aligned with control indications 52. By having the light sources 66 not aligned with the control indications 52, there is a reflective surface beneath control indications 52 to enhance the light output through control indications 52. As long as the lights from light sources 66 can reach control indications 52 they will be illuminated.

Furthermore the openings 78, the control indications 52 and the outer, peripheral edges 74 are a very small percentage of the overall surface area of top 24 such that they are a trivial portion of the surface area of top 24.

Whilst there has been described in the foregoing description a preferred embodiment of the present invention, it will be understood by those skilled in the technology concerned that many variations or modifications in details of design, construction and operation may be made without departing from the present invention.

The invention claimed is:

1. A portable device comprising:
   (a) a body;
   (b) at least one wall of the body being of a translucent material and having an outer surface, an inner surface and an outer peripheral edge surface;
   (c) the outer surface being coated with a first non-translucent material, there being a plurality of outer openings in the first non-translucent material to form a plurality of control indications;
   (d) the inner surface being coated with a second non-translucent material, there being at least one inner opening in the second non-translucent material aligned with at least one light source;
   (e) the first non-translucent coating and the second non-translucent coating causing internal reflection within the at least one wall except for the outer openings, and the outer peripheral edge through which light from the at least one light source is able to pass.

2. A portable device as claimed in claim 1, further comprising a power controller for controlling power to the at least one light source, the control being at least one selected from the group consisting of:
   (a) increasing power from off to full power when the portable device is activated;
   (b) decreasing power from full power to off when the portable device is deactivated; and
   (c) cyclically increasing power from off to full power to off in a repeated cycle when the portable device is connected to an external source of power.

3. A portable device as claimed in claim 2, wherein the increase and decrease in power are both steady and over a predetermined time, the predetermined time is in the range 0.5 to 5 seconds.

4. A portable device as claimed in claim 2, wherein the cycle of (c) is to simulate a naturally-occurring cyclic pattern in at least one of: amplitude, and period.

5. A portable device as claimed in claim 4, wherein the cyclic pattern is selected from the group consisting of: a heartbeat pattern, and a breathing pattern.

6. A portable device as claimed in claim 2, further comprising an illuminated display screen, the power controller also controlling power for the illumination of the display screen in the same manner as the at least one light source.

7. A portable device as claimed in claim 6, wherein the at least one wall is a top of the body, the display screen being located beneath an opening in the first non-translucent coating.

8. A portable device as claimed in claim 1, wherein the outer peripheral edges have a groove, at least a part of the groove not being coated with the first non-translucent coating.

9. A portable device as claimed in claim 1, wherein each of the plurality control indications are for one of a plurality control zones and are an indication of a function of the control zone; the plurality of light sources not being aligned with the plurality of control indications.

10. A portable device comprising:
  (a) a source of power;
  (b) a power controller;
  (c) a microprocessor;
  (d) a memory;
  (e) at least one light source for illuminating at least one of a plurality of control indications and an outer peripheral groove;
    the power controller being for controlling power to the at least one light source; the power controller cyclically increasing and decreasing power between two levels in a repeated cycle when the portable device is connected to an external source of power.

11. A portable device as claimed in claim 10, wherein the increase and decrease in power are both steady and over a predetermined time, the predetermined time is in the range 0.5 to 5 seconds.

12. A portable device as claimed in claim 10 further comprising:
  (a) a body;
  (b) at least one wall of the body being of a translucent material and having an outer surface, an inner surface and the outer peripheral groove;
  (c) the outer surface being coated with a first non-translucent material, there being a plurality of outer openings in the first non-translucent material to form a plurality of control indications;
  (d) the inner surface being coated with a second non-translucent material, there being at least one inner opening in the second non-translucent material aligned with at least one light source;
  (e) the first non-translucent coating and the second non-translucent coating causing internal reflection within the at least one wall except for the outer openings and the outer peripheral groove through which light from the at least one light source is able to pass.

13. A portable device as claimed in claim 12, wherein the at least one wall is a top of the body, a display screen being located beneath an opening in first non-translucent coating; the power controller also controlling power for the illumination of the display screen in the same manner as the at least one light source.

14. A portable device as claimed in claim 10, wherein each of the plurality control indications are for one of a plurality control zones, each of the plurality of control zones being an indication of a function of the control zone; the plurality of light sources not being aligned with the plurality of control indications.

15. A portable device as claimed in claim 10, wherein the outer peripheral groove has a vertical portion and a horizontal portion, at least one of the vertical portion and the horizontal portion not being coated with the first non-translucent coating.

16. A method for controlling illumination of a portable device using a power controller of the portable device to control power supplied to at least one light source for providing the illumination, the method comprising:
  (a) detecting connection of the device to an external source of power; and
  (b) cyclically increasing and decreasing power between two levels in a repeated cycle when the portable device is connected to the external source of power.

17. A method as claimed in claim 16, wherein the increase and decrease in power are both steady and over a predetermined time, the predetermined time is in the range 0.5 to 5 seconds.

18. A method as claimed in claim 16, the portable device further comprising an illuminated display screen, the power controller also controlling power for the illumination of the display screen in the same manner as the at least one light source.

19. A method as claimed in claim 16, wherein the cycle of (c) is to simulate a naturally-occurring cyclic pattern in at least one of: amplitude, and period.

20. A method as claimed in claim 19, wherein the cyclic pattern is selected from the group consisting of: a heartbeat pattern, and a breathing pattern.

* * * * *